United States Patent
Abdel Shahid et al.

(10) Patent No.: US 11,096,096 B1
(45) Date of Patent: Aug. 17, 2021

(54) DUAL CONNECTIVITY CONTROL BASED ON DOWNLINK DATA AT A 5G BASE STATION

(71) Applicant: T-Mobile USA, Inc., Bellevue, WA (US)

(72) Inventors: Wafik Abdel Shahid, Kenmore, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/020,089

(22) Filed: Sep. 14, 2020

(51) Int. Cl.
*H04W 36/00* (2009.01)
*H04W 92/20* (2009.01)

(52) U.S. Cl.
CPC ........ *H04W 36/0069* (2018.08); *H04W 92/20* (2013.01)

(58) Field of Classification Search
CPC ........... H04W 36/00–38; H04W 92/20; H04W 36/0069
See application file for complete search history.

(56) References Cited

U.S. PATENT DOCUMENTS

| 2014/0335882 | A1* | 11/2014 | Lee | H04W 76/15 455/452.2 |
| 2021/0105765 | A1* | 4/2021 | Cirik | H04B 7/0639 |

FOREIGN PATENT DOCUMENTS

| CN | 110291829 A | * | 9/2019 | ............ H04W 52/44 |
| CN | 111866973 A | * | 10/2020 | ............ H04W 24/10 |
| WO | WO-2008056426 A1 | * | 5/2008 | ............ H04W 72/02 |
| WO | WO-2013191084 A1 | * | 12/2013 | ............. H04L 5/001 |
| WO | WO-2014148874 A1 | * | 9/2014 | ........ H04W 36/0066 |
| WO | WO-2014163550 A1 | * | 10/2014 | ........... H04B 17/345 |
| WO | WO-2015015298 A2 | * | 2/2015 | ............ H04W 76/15 |
| WO | WO-2016013899 A1 | * | 1/2016 | ........... H04B 17/318 |

* cited by examiner

*Primary Examiner* — Charles T Shedrick
(74) *Attorney, Agent, or Firm* — Lee & Hayes, P.C.

(57) ABSTRACT

Techniques for dual connectivity control based on downlink data are discussed herein. A Fourth Generation (4G) base station can receive downlink data to be transmitted to a user equipment (UE). The 4G base station can also receive data from the UE indicating that the UE is associated with a low power state. The 4G base station can further determine a capability of the base station (e.g., an available bandwidth) to transmit the downlink data to the UE. If an amount of downlink data is below a threshold, operations can refrain from establishing a dual connectivity connection. If an amount of downlink data is above a threshold, operations can include establishing a dual connectivity connection. In some cases, thresholds and/or the decision to initiate dual connectivity can be determined based on the state data associated with the UE, such as a battery status, a level of user interaction, and the like.

20 Claims, 9 Drawing Sheets

DUAL CONNECTIVITY CONTROL BASED ON DOWNLINK DATA AT A 5G BASE STATION

BACKGROUND

Dual connectivity arrangements can allow a user equipment (UE), such as a mobile phone, to wirelessly connect to different base stations of a telecommunication network simultaneously. In some examples, the base stations can use different radio access technologies.

For example, a UE can connect to one base station using a Fifth Generation (5G) New Radio (NR) connection and also connect to another base station using a Fourth Generation (4G) Long-Term Evolution (LTE) connection. This type of dual connection can be referred to as an E-UTRAN New Radio-Dual Connectivity (EN-DC) connection. However, in some cases, the UE can use more energy to establish and/or maintain an EN-DC connection than the UE would use to establish and/or maintain an LTE connection alone.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
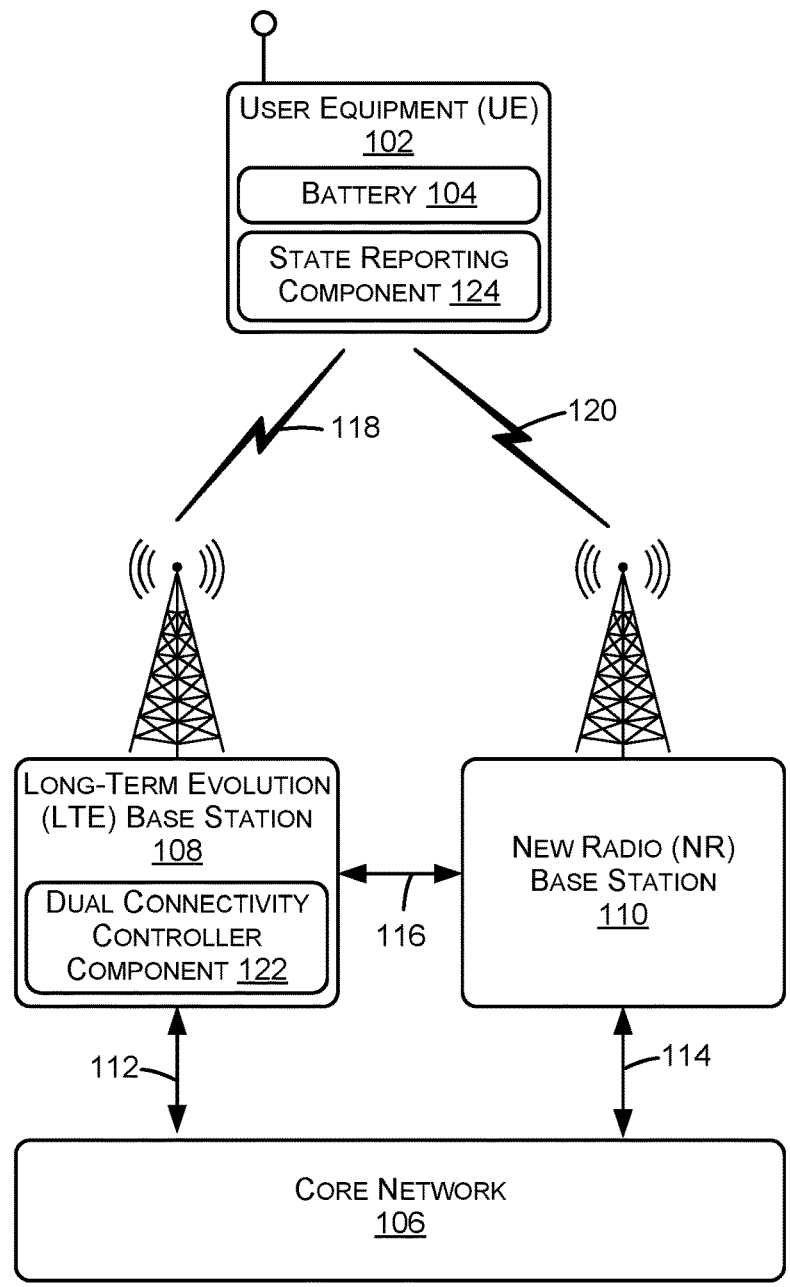
FIG. 1 shows an example network environment in which a UE can connect to a telecommunication network.

Techniques for dual connectivity control based on downlink data are discussed herein. For example, data received at a buffer associated with a downlink connection can be compared relative to a capability of a base station to transmit the data. If an amount of data is below a threshold, operations can refrain from establishing a dual connectivity connection. If an amount of data is above a threshold, operations can include establishing a dual connectivity connection. In some examples, one or more thresholds can be determined based on state data associated with user equipment, such as a battery status, a level of user interaction, and the like.

Multiple radio access technology (RAT) Dual Connectivity (MR-DC) techniques have been developed that allow a UE to simultaneously use multiple types of radio access technologies to connect to a telecommunication network. For example, a radio access network (RAN) of the telecommunication network can include one or more base stations that use LTE radio access technologies, such as LTE evolved Node Bs (eNBs). The RAN of the telecommunication network can also include one or more base stations that use 5G NR radio access technologies, such as 5G gNBs. A UE that supports both LTE and 5G NR can use an E-UTRAN New Radio-Dual Connectivity (EN-DC) connection to wirelessly connect to both an LTE eNB and a 5G gNB. The UE can then send and/or receive data via one or both of the LTE connection and the 5G connection. The 5G connection alone, and/or in combination with the LTE connection, may have a higher throughput, better reliability, or other benefits relative to the LTE connection alone.

However, in some examples the UE may use more energy to establish and/or maintain an EN-DC connection than the UE would use to establish and/or maintain an LTE connection alone. Accordingly, an EN-DC connection may drain a battery of the UE more quickly than an LTE connection alone. In some examples, the benefits of the EN-DC connection, such as a higher throughput, relative to an LTE connection alone may be considered worth the higher battery drain rate. However, in situations in which the benefits of the EN-DC connection may be unlikely to be perceived by a user of the UE, battery life of the UE can be extended by disabling the EN-DC connection and instead using an LTE connection alone.

The systems and methods described herein can be used to select or otherwise determine, at a base station (e.g., the LTE base station and/or an NR base station) or at a network device, whether to use an EN-DC connection that includes both an LTE connection and a 5G connection, or to use the LTE connection (or NR connection) alone. As noted above, if an amount of data is below a threshold, operations can refrain from establishing a dual connectivity connection. If an amount of data is above a threshold, operations can include establishing a dual connectivity connection. In some examples, one or more thresholds (and/or the decision to establish or downgrade an EN-DC connection) can be determined based on state data associated with user equipment, such as a battery status, a level of user interaction, and the like.

In some examples, the techniques discussed herein can be implemented in the context of protocols associated with one or more of 3G, 4G, 4G LTE, 5G protocols. In some examples, the network implementations can support standalone architectures, non-standalone architectures, dual connectivity, carrier aggregation, etc. Example implementations are provided below with reference to the following figures.

FIG. 1 shows an example network environment 100 in which a UE 102 can connect to a telecommunication network to engage in communication sessions for voice calls, video calls, messaging, data transfers, and/or any other type of communication. The UE 102 can be any device that can wirelessly connect to the telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device.

The UE 102 can include a battery 104 that stores energy used to power the functions of the UE 102. The battery 104 can be a lithium-ion (Li-ion) battery, a lithium-ion polymer (LiPo) battery, a nickel cadmium (NiCad) battery, a nickel-metal hydride (NiMH) battery, or other type of battery. In some examples, the battery 104 can be rechargeable. For instance, the energy level of the battery 104 can increase when the UE 102 is connected to a wall outlet, a portable charger, or another external power source. However, operations of the UE 102 can also use energy and thus drain the battery 104 when the battery 104 is not charging.

The telecommunication network can have one or more access networks that include base stations and/or other access points, as well as a core network 106 linked to the access network. The access networks and/or the core network 106 can be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The UE 102 can wirelessly connect to one or more base stations or other access points of the access networks, and in turn be connected to the core network 106 via the base stations or other access points. In some examples, the core network 106 can be a packet core network of an LTE network, which may be referred to as an Evolved Packet Core (EPC). In other examples, the core network 106 can be a 5G core network.

The access networks can include an LTE access network known as an Evolved UMTS Terrestrial Radio Access Network (E-UTRAN). Base stations of the LTE access network can be known as eNBs, such as the eNB 108 shown in FIG. 1. The access networks can also include 5G access networks with base stations known as gNBs, such as the gNB 110 shown in FIG. 1. In some examples, the eNB 108 and the gNB 110 may be located at the same cell site. In other examples, the eNB 108 and the gNB 110 may be located at different cell sites.

One or both of the eNB 108 and the gNB 110 can be connected to the core network 106. For example, one or both of the eNB 108 and the gNB 110 may be connected to the core network 106 via S1 interfaces (e.g., interfaces 112 and 114), or other interfaces, for transmission of user plane data and/or control plane data. The eNB 108 and the gNB 110 may also be connected to each other over an X2 interface (e.g., an interface 116), or other interface, for transmission of user plane data and/or control plane data.

The UE 102 and the telecommunication network can be configured to support dual connectivity between the UE 102 and multiple base stations in the access network. For example, the UE 102 can establish an LTE connection 118 with the eNB 108 and a 5G connection 120 with the gNB 110. The UE 102 can thus establish an EN-DC connection with the telecommunication network that uses both the LTE connection 118 and the 5G connection 120. However, as will be discussed below, when the UE 102 does not establish or maintain the EN-DC connection, the UE 102 may instead use the LTE connection 118 alone without the 5G connection 120. In some examples, the UE 102 may use the 5G connection 120 without the LTE connection 118.

An EN-DC connection that uses both the LTE connection 118 and the 5G connection 120 may be based on a 3GPP EN-DC configuration, such as an "option 3x" EN-DC configuration, "option 3" EN-DC configuration, "option 3a" EN-DC configuration, or other EN-DC configuration. In some of these examples, the eNB 108 can be a primary node in the EN-DC configuration, while the gNB 110 can be a secondary node. In other examples, the gNB 110 can be the primary node and the eNB 108 can be the secondary node. The primary node may be configured to exchange control plane data with the core network 106, the UE 102, and with the secondary node. In some examples, the secondary node may not have direct interfaces for exchanging control plane data with the core network 106 and/or the UE 102, but may send and receive control plane data via the primary node. In some examples, both the eNB 108 and the gNB 110 may be configured to directly exchange user plane data with the core network 106. In other examples, one of the eNB 108 and the gNB 110 may instead indirectly exchange user plane data with the core network 106 via the other one of the eNB 108 and the gNB 110.

When the UE 102 connects to the core network 106 via one or both of the eNB 108 and the gNB 110, one or more bearers can be established between the core network 106 and the UE 102. Bearers can be virtual channels used to transport data for the UE 102 between network elements. For example, an E-UTRAN Radio Access Bearer (E-RAB) can be established between a gateway (e.g., a gateway node such as an serving gateway, a proxy gateway, etc.) of the core network 106 and the UE 102, with the E-RAB including an S1 bearer between the gateway of the core network 106 and the eNB 108, and a data radio bearer between the eNB 108 and the UE 102. The LTE connection 118 can thus be associated with the data radio bearer between the eNB 108 and the UE 102. The 5G connection 120 can similarly be associated with a data radio bearer between the gNB 110 and the UE 102.

Multiple bearers can be set up between the network elements for different types of traffic for the UE 102. For example, the telecommunication network can set up a default bearer for general traffic associated with the UE 102, as well as dedicated bearers for traffic associated with specific services. For instance, a dedicated bearer can be set up for voice call data when the UE 102 is engaged in a voice call.

In some examples, a bearer between the core network 106 and the UE 102 can be established as a split bearer that passes through both the eNB 108 and the gNB 110 when an EN-DC connection has been established for the UE 102. For instance, a bearer can exist between the core network 106 and the eNB 108, and the bearer can split into two legs at the eNB 108. A first leg of the split bearer can be associated with the LTE connection 118 between the eNB 108 and the UE 102. A second leg of the split bearer may pass from the eNB 108 to the gNB 110 and then to the UE 102, such that the second leg is associated with the 5G connection 120 between the gNB 110 and the UE 102. In other examples, the bearer may be established from the core network 106 to the gNB 110, where the bearer can be split into two legs associated with the LTE connection 118 and the 5G connection 120 such that data is received at the gNB 110 and a first portion of data is transmitted to the UE 102 via the 5G connection 120 and a second portion of the data is passed to the eNB 108 to be transmitted to the UE via the LTE connection 118. In still other examples, a first bearer can be established from the core network 106 to the eNB 108 and to the UE 102, while a separate second bearer can be established from the core network 106 to the gNB 110 and to the UE 102. In these examples, a portion of the first bearer can be associated with the LTE connection 118, while a portion of the second bearer can be associated with the 5G connection 120.

Establishing and using an EN-DC connection can provide benefits to the UE 102. For example, in some situations the 5G connection 120 can provide increased data throughput to and/or from the UE 102 when the 5G connection 120 is used alone or in combination with the LTE connection 118, relative to data throughput that can be achieved via the LTE connection 118 alone. However, in some situations the UE 102 may expend more energy when using an EN-DC connection than the UE 102 would expend when using the LTE connection 118 alone. Accordingly, the battery 104 of the UE 102 may drain more quickly when the UE 102 uses an EN-DC connection, relative to when the UE 102 uses the LTE connection 118 alone.

An entity, such as a manufacturer of the UE, an operator of the telecommunication network, or a user of the UE may consider the benefits of the EN-DC connection to be worth draining the battery 104 more quickly in some situations. For example, the entity may consider an increased data throughput level provided by the EN-DC connection to be an acceptable trade-off for the battery 104 draining more quickly, if an amount of downlink data to be transmitted to the UE 102 is above a threshold level, such as when a user is streaming video or is downloading a large file via the UE 102. However, in other situations in which the user is less likely to perceive the benefits of the EN-DC connection, the entity may prefer that battery life be preserved. For instance, if a user is not actively using the UE 102, the faster drain rate of the battery 104 due to an EN-DC connection may be frustrating to the user.

Accordingly, the LTE base station 108 can include a dual connectivity controller component 122 that can determine a capability of the LTE base station 108 and/or can receive state data associated with the UE 102 from a state reporting component 124. Based at least in part on the capability of the LTE base station 108 and/or on the UE state data, the dual connectivity controller component 122 can determine a threshold level for an amount data above which the LTE base station 108 can initiate an EN-DC connection.

For example, a capability of the LTE base station 108 can be based at least in part on an available capacity for the LTE base station 108 to transmit downlink data in a particular period of time, such as a next transmission time interval (TTI). In some examples, the capability of the LTE base station 108 can be based at least in part on a Channel Quality Indicator (CQI) associated with the LTE connection 118, as well as other factors, as discussed herein.

In some examples, the threshold can be set or otherwise determined based at least in part on UE state data received from the state reporting component 124. For example, the UE state data can include indication(s) of a power level of the battery 104, whether the UE 102 is charging, a location of the UE 102, whether the UE 102 is in a power saving mode, whether a display of the UE 102 is on, application(s) running on the UE 102, GPS data associated with the UE 102, whether a user is facing the display of the UE 102 (e.g., as determined by camera data), and the like.

Further, in some examples, the threshold can be set or otherwise determined based at least in part on a data type (e.g., voice, video, data, TCP, UDP, etc.), subscriber type (e.g., a first subscriber type relative to a second subscriber type that has a higher priority of service than the first subscriber type, whether the subscriber is roaming, etc.), and the like.

In general, the dual connectivity controller component 122 can determine when the UE 102 should use the EN-DC connection (e.g., Option 3, Option 3a, Option 3x, etc.), when the UE 102 should use the LTE connection 118 alone, or when the UE should use the NR connection 120 alone. The dual connectivity controller component 122 can preserve battery life of the UE 102 in situations in which a user is unlikely to perceive benefits of the EN-DC connection, by causing the UE 102 to use the LTE connection 118 alone (or the NR connection 120 alone) during such situations. Operations of the dual connectivity controller component 122 are discussed in more detail throughout this disclosure.

Figure 2:
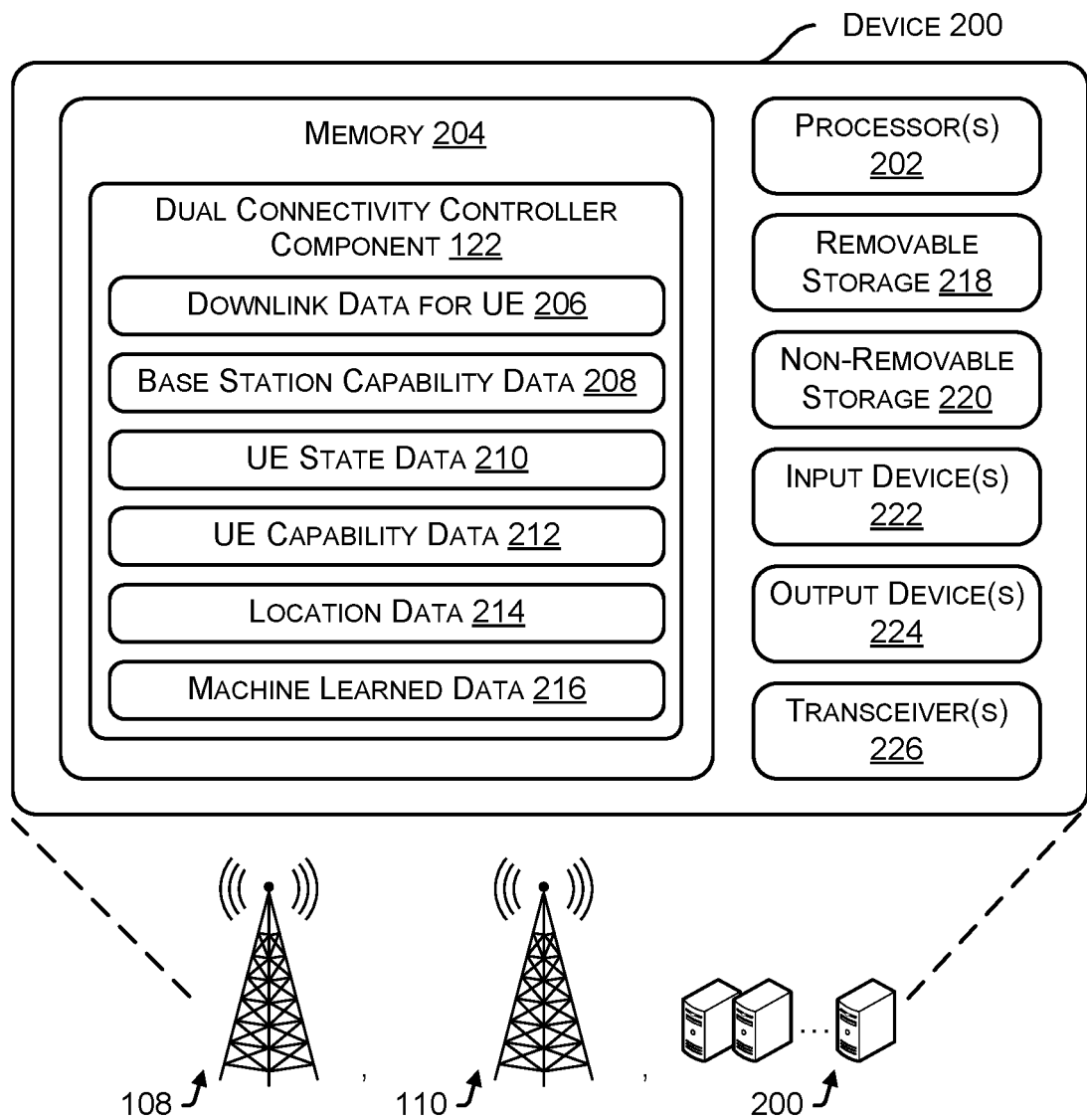
FIG. 2 is a block diagram of a device including a dual connectivity controller component.

FIG. 2 is a block diagram of a device 200 including a dual connectivity controller component. In some examples, the device 200 can be configured to implement the techniques discussed herein.

FIG. 2 shows only basic, high-level components of the device 200.

Generally, the device 200 may comprise and/or may be implemented in any of various network components discussed herein, including those components illustrated in FIG. 1. For example, the device 200 may be implemented in the eNB 108, the gNB 110, the core network 106, or other network device.

In various examples, the device 200 may include processor(s) 202 and memory 204. Depending on the exact configuration and type of computing device, the memory 204 may be volatile (such as RAM), non-volatile (such as ROM, flash memory, etc.) or some combination of the two. The memory 204 may include the dual connectivity controller component 122, which may include downlink data for UE 206, base station capability data 208, UE state data 210, UE capability data 212, location data 214, and/or machine learned data 216.

In some examples, the dual connectivity controller component 122 can include functionality to determine when to maintain single connection with a UE (e.g., an LTE connection or an NR connection), when to initiate an EN-DC connection, and/or, when to downgrade from an EN-DC connection to a single LTE or NR connection. The dual connectivity controller component 122 can use the data illustrated in FIG. 2 to determine threshold(s) for maintaining a single connection, initiating an EN-DC connection, and/or downgrading to a single connection. For example, the dual connectivity controller component 122 can control a dual connectivity connection based at least in part on the downlink data for UE 206, the base station capability data 208, the UE state data 210, the UE capability data 212, the location data 214, and/or the machine learned data 216.

In some examples, the downlink data for UE 206 can include an amount of data to be transmitted to a UE from the device 200. For example, the downlink data for UE 206 (also referred to as downlink data 206) can include data stored in a transmit butter associated with the device 200. In some examples, the downlink data 206 can represent an amount of data to be transmitted to a UE in a next transmission time interval (TTI) associated with an LTE connection. In some examples, the downlink data 206 can include metadata such as a type of data (e.g., voice, video, data, gaming, TCP, UDP, etc.).

In some examples, the base station capability data 208 can include data associated with an amount of bandwidth that the device 200 can assign to transmitting the downlink data 206 in a next time period, such as a TTI. In some examples, the base station capability data 208 can be based at least in part on signal data associated with a connection between the device 200 (e.g., the LTE connection 118) and a UE (e.g., the UE 102). For example, the base station capability data 208 (also referred to as capability data 208) can be based at least in part on signal data comprising one or more of Channel Quality Information (CQI) data, signal-to-noise ratio (SNR) data, signal-to-interference plus noise ratio (SINR) data, and/or signal-to-noise plus distortion ratio (SNDR) data.

For example, the CQI data may indicate that the LTE connection 118 between the eNB 108 and the UE 102 is associated with a particular QAM (quadrature amplitude modulation). For example, at a first CQI, the LTE connection 118 may be associated with a first QAM (e.g., 16 QAM), while at a second CQI, the LTE connection 118 may be associated with a second QAM (e.g., 64 QAM). Thus, in this example, an LTE connection associated with the second QAM would be associated with twice the data capacity as an LTE connection associated with the first QAM (e.g., for a same number of symbols). Accordingly, the capability data 208 can be based on the signal data, as discussed herein.

The capability data 208 can also be based at least in part on an amount of traffic and/or congestion at the device 200 or associated with an LTE and/or NR connection. For example, as a number of devices and/or connections between the device 200 and other UEs increases, an amount of resources to be allocated to a UE may decrease. In some examples, an amount of resources may be based at least in part on subscriber level, device type, location, and the like. Accordingly, the capability data 208 can be based on a number of factors or data, as discussed herein.

In some examples, the UE state data 210 can include data received from the UE representing one or more conditions at the UE. In some examples, the UE state data 210 can be received from the state reporting component 124. In some examples, the UE state data 210 can represent data about a display status of the UE, sensor data from the UE, an application type associated with the UE, an indication that the UE is associated with a low power mode, an amount of power in a battery associated with the UE, a charge state indication associated with the UE, as well as other factors. The dual connectivity controller component 122 can determine a data threshold for maintaining a single connection, initiating an EN-DC connection, or downgrading a connection based on such UE state data 210.

In some examples, the data about a display status of the UE may indicate that a display is active or inactive, such as whether the display is turned on and/or displaying images, or is turned off and/or not displaying images. In some examples, data about a display status may indicate whether the display of the UE is in active use by a user. For example, if the display is a touch-sensitive screen, data about the display status may indicate whether touch inputs are being received from a user. In some examples, data indicative of a high level of interaction with a display can lower a threshold or increase a likelihood associated with initiating an EN-DC connection, while data indicative of a low level of interaction with a display can increase a threshold or decrease a likelihood associated with initiating an EN-DC connection.

In some examples, the sensor data from the UE can include information from cameras, sensors, and/or other input devices of the UE. In some examples, input devices of the UE may include a front-facing camera, infrared sensor, light sensor, proximity sensor, and/or other sensors. Sensor data may include data captured by such sensors, or data derived from the data captured by the sensors. For example, an operating system or an application of the UE can be configured to use data captured by front-facing sensors to perform facial recognition, detect when a face of a user is oriented toward the display of the UE, and/or when eyes of the user are looking at the display. In some examples, data indicative of an identified user or of a user facing a display can lower a threshold (or increase a likelihood) associated with initiating an EN-DC connection, while data not indicative of those factors can increase a threshold (or decrease a likelihood) associated with initiating an EN-DC connection.

In some examples, data about an application type associated with the UE may indicate a type of application being executed by the UE. For example, data about the application type may indicate that the application is a video streaming application, a web browser, a social media application, or any other type or class of application. In some examples, data about the application type may directly identify the specific application being executed by the UE, via an application name, process name, or other unique identifier.

In some examples, the dual connectivity controller component 122 can be configured with a predefined list of applications and/or types of application, along with corresponding indications of whether specific applications or types of applications should use an EN-DC connection or an LTE connection 118 alone. Accordingly, in such examples, the dual connectivity controller component 122 can use information about the application type to find a corresponding entry on the predetermined list, and determine if the application is associated with a predefined preference for using an EN-DC connection or an LTE connection 118 alone. The dual connectivity controller component 122 may use such an entry on the predetermined list when determining whether to use the EN-DC connection or the LTE connection 118 alone.

In some examples, the UE state data 210 can include an indication that the UE is associated with a low power mode. For example, a UE may automatically enter a low-power state after a period of inactivity or based on a charge status. In some examples, a UE may enter a low-power state based on a user preference. In any event, the dual connectivity controller component 122 can determine a data threshold (or likelihood) for maintaining a single connection, initiating an EN-DC connection, or downgrading a connection based on an indication of whether the UE is associated with a low power state.

Similarly, the dual connectivity controller component 122 can receive an indication of an amount of power in a battery associated with the UE. In some examples, the indication of an amount of power can be represented as a scalar value, as a percentage, as an amount of time until the UE battery is depleted based on current or estimated usage, and the like. The dual connectivity controller component 122 can determine a data threshold for maintaining a single connection, initiating an EN-DC connection, or downgrading a connection based on an indication of the amount of power in a battery associated with the UE.

In some examples, a charge state indication associated with the UE can indicate whether the UE is currently being charged and/or an amount of time to a full battery or to a particular charge level. The dual connectivity controller component 122 can determine a data threshold for maintaining a single connection, initiating an EN-DC connection, or downgrading a connection based on an indication of the charge state of the UE.

In some examples, the UE capability data 212 can include an indication of whether the UE supports an EN-DC connection, an LTE connection, and/or an NR connection. In some examples, the UE capability data 212 can include an indication of particular frequency bands that the UE supports so that the dual connectivity controller component 122 can optimize traffic between multiple devices. In some examples, the UE capability data 212 can indicate various modulation schemes supported by the UE, which may factor into the base station capability data 208, as discussed above.

In some examples, the location data 214 can include a location of the UE. For example, the location data 214 can be based on GPS data, base station triangulation data, and the like. In some examples, the location data 214 can include velocity data and heading data, which may be indicative of the UE being at one location for a period of time or on the move (e.g., in a vehicle).

In some examples, the machine learned data 216 can include one or more machine learned models or heuristics that can be used to determine whether to maintain a single connection, initiate an EN-DC connection, or downgrade a connection based on an indication of the charge state of the UE. For example, the machine learned data 216 can include weight(s) for various factors that can be used to set threshold (s) or likelihoods and/or determine factors that increase or decrease threshold(s) or likelihoods, and by how much.

In some examples, the dual connectivity controller component 122 can be configured to weight different factors more heavily than other factors, and/or consider different factors in different orders. For example, if a data type of downlink data 206 indicates that data over a threshold size is to be transmitted to the UE, the dual connectivity controller component 122 can be configured to weight that factor more heavily than data indicative of a display status of the UE or than data indicative of the charge state of the UE, and thus may determine to use an EN-DC connection to send the data even though a power level of the batter is below a threshold. However, in other examples, the dual connectivity controller component 122 may be configured to weight the charge state equally with, or more heavily than, a data type or an amount of data relative to a capability of a base station.

In some examples, the processor(s) 202 is a central processing unit (CPU), a graphics processing unit (GPU), both CPU and GPU, or other processing unit or component known in the art. Furthermore, the processor(s) 202 may include any number of processors and/or processing cores. The processor(s) 202 is configured to retrieve and execute instructions from the memory 204.

The memory 204 can also be described as non-transitory computer-readable media or machine-readable storage memory, and may include removable and non-removable media implemented in any method or technology for storage of information, such as computer executable instructions, data structures, program modules, or other data.

The memory 204 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 200 also includes additional data storage devices (removable and/or non-removable) such as, for example, magnetic disks, optical disks, or tape. Such additional storage is illustrated in FIG. 2 by removable storage 218 and non-removable storage 220. Tangible computer-readable media can include volatile and non-volatile, removable and non-removable media implemented in any method or technology for storage of information, such as computer readable instructions, data structures, program modules, or other data. The memory 204, the removable storage 218 and the non-removable storage 220 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 200. Any such tangible computer-readable media can be part of the device 200.

The memory 204, the removable storage 218, and/or the non-removable storage 220 may in some cases include storage media used to transfer or distribute instructions, applications, and/or data. In some cases, the memory 204, the removable storage 218, and/or the non-removable storage 220 may include data storage that is accessed remotely, such as network-attached storage that the device 200 accesses over some type of data communications network.

In various examples, any or all of the memory 204, the removable storage 218, and/or the non-removable storage 220 may store programming instructions that, when executed, implement some or all of the function functionality described herein.

The device 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the device 200 also includes one or more wired or wireless transceiver(s) 226. For example, the transceiver(s) 226 can include a network interface card (NIC), a network adapter, a LAN adapter, or a physical, virtual, or logical address to connect to various networks, devices, or components illustrated in figures herein. To increase throughput when exchanging wireless data, the transceiver(s) 226 can utilize multiple-input/multiple-output (MIMO) technology. The transceiver(s) 226 can comprise any sort of wireless transceivers capable of engaging in wireless, radio frequency (RF) communication. The transceiver(s) 226 can also include other wireless modems, such as a modem for engaging in Wi-Fi, WiMAX, Bluetooth, infrared communication, and the like.

In some examples, the device 200 can be implemented as the UE 102 including the battery 104 and/or the state reporting component 124.

FIGS. 3-9 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

Figure 3:
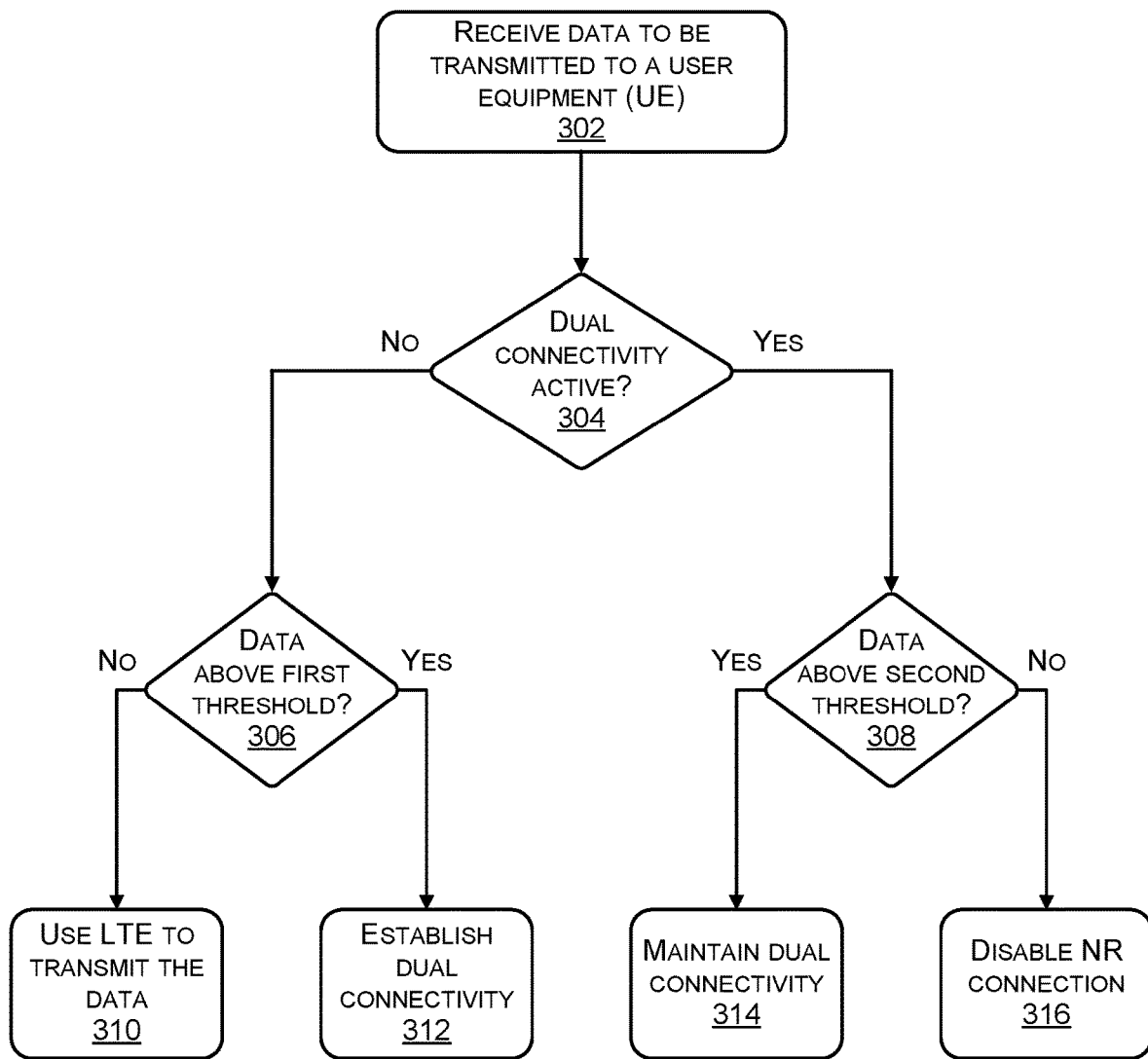
FIG. 3 illustrates an example process for dual connectivity control.

FIG. 3 illustrates an example process 300 for dual connectivity control. The example process 300 can be performed by the eNB 108, the gNB 110, and/or by the device 200 comprising the dual connectivity controller component 122, or another component or device as discussed herein.

At operation 302, the process can include receiving data to be transmitted to a user equipment (UE). In some examples, the operation 302 can include receiving the data in response to a request from the UE. In some examples, the data can be received at a buffer associated with at least one base station, such as the eNB 108 or the gNB 110, or by a device 200.

At operation 304, the process can include determining whether dual connectivity is active for a connection associated with the UE. If an EN-DC connection is not established between the UE and an eNB and a gNB (e.g., "no" in operation 304), the process continues to operation 306. If an EN-DC connection is established between the UE and an eNB and a gNB (e.g., "yes" in operation 304), the process continues to operation 308.

At operation 306, the process can include determining whether data (e.g., the data received in the operation 302) is above a first threshold. In some examples, the first data threshold can be based at least in part on a base station capability (e.g., an amount of data that can be transmitted to the UE in a next time period (such as a TTI) via an LTE connection), UE state data (e.g., a charge state of the UE, whether the UE is associated with a low power mode), the downlink data (e.g., a type and/or amount of data to be transmitted in a next TTI), and the like. For example, the first threshold can be based at least in part on one or more factors or data discussed above in connection with the dual connectivity controller 122. If the data is not above the first threshold (e.g., "no" in operation 306), operation 310 can include using LTE (e.g., the LTE connection 118) to transmit the data. If the data is above the first threshold (e.g., "yes" in operation 306) (and by how far above the threshold and for how long), operation 312 can include establishing dual connectivity (e.g., establishing an EN-DC connection between the UE 102, the eNB 108, and the gNB 110).

At operation 308, the process can include determining whether data (e.g., the data received in the operation 302) is above a second threshold. In some examples, the data can correspond to first downlink data to be transmitted by an eNB, second downlink data to be transmitted by a gNB, or third downlink data which corresponds to an aggregate of the first downlink data and the second downlink data. In some examples, the second data threshold can be the same as the first data threshold, or in some examples, the second data threshold can be different than the first data threshold. In some examples, the second data threshold can be based at least in part on the first data threshold.

In some examples, the second data threshold of operation 308 can be based at least in part on a base station capability (e.g., an amount of data that can be transmitted to the UE in a next TTI via an LTE connection), UE state data (e.g., a charge state of the UE, whether the UE is associated with a low power mode), the downlink data (e.g., a type and/or amount of data to be transmitted in a next TTI), and the like. For example, the second threshold can be based at least in part on one or more factors or data discussed above in connection with the dual connectivity controller 122.

In some examples, the second threshold (and/or the first threshold, discussed above) can be based at least in part on a time period or a number of TTIs. For example, there may be threshold amount of time above for which an amount of data may be above (or below) a threshold before the corresponding action is taken.

If the data is above the second threshold (e.g., "yes" in operation 308), operation 314 can include maintaining dual connectivity (e.g., the LTE connection 118 and the NR connection 120) to transmit the data. If the data is not above the second threshold (e.g., "no" in operation 308), operation 316 can include disabling an NR connection portion of the EN-DC connection.

Figure 4:
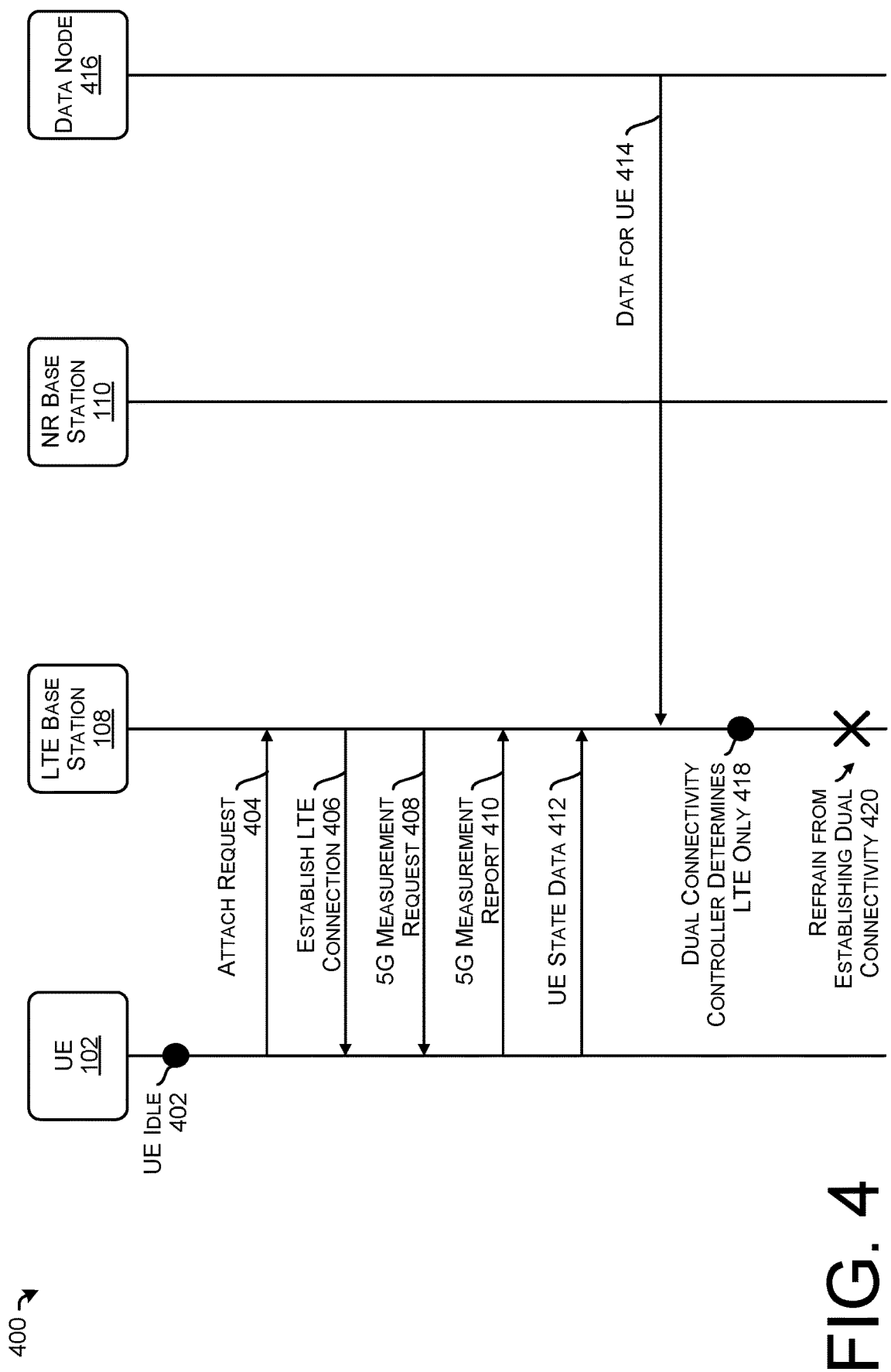
FIG. 4 shows a first sequence diagram of example operations and messages a base station can use to prevent an EN-DC connection from being established.

FIG. 4 shows a first sequence diagram 400 of example operations and messages a base station can use to prevent an EN-DC connection from being established.

At point 402, the UE 102 can be idle. For example, the UE 102 may be in a Radio Resource Control (RRC) idle state in which no active connection exists between the UE 102 and the eNB 108. However, when the UE 102 determines that data is to be exchanged with the UE 102, the UE 102 can enter an active or connected state and send an attach request (also referred to as a connection request) to the eNB 108 at point 404. For example, the UE 102 can change from an RRC idle state to an RRC connected state when the UE 102 receives a paging message from the eNB 108 indicating that the telecommunication network has data to send to the UE 102, or because the UE 102 has data to send via the telecommunication network. In some examples, the connection request can be an RRC connection request. In response to the connection request, at point 406 the UE 102 and the eNB 108 can establish the LTE connection 118. Establishment of the LTE connection 118 can include establishing one or more bearers associated with the LTE connection 118.

At point 408, the eNB 108 can send a 5G measurement request to the UE 102. In some examples, the 5G measurement request can be included in an RRC reconfiguration message sent by the eNB 108. The 5G measurement request can request that the UE 102 measure signal strengths and/or other attributes related to 5G NR frequencies that may be used to connect to the gNB 110, and send a 5G measurement report containing such measurements to the eNB 108. In some examples, the eNB 108 can be configured to determine from the 5G measurement report returned by the UE 102 whether the measurements are sufficient for a 5G connection 120, and if so, instruct the gNB 110 to establish the 5G connection 114 with the UE 102 in addition to the LTE connection 112 established at point 406. In other examples, the eNB 108 may pass the 5G measurement report to the gNB 110 or other network entity (e.g., a network entity including the dual connectivity controller component 122) to determine whether to establish the 5G connection 120.

At point 412 the UE 102 can send UE state data to the eNB 108. As discussed herein, the UE state data can include, but is not limited to, one or more of data about a display status of the UE, sensor data from the UE, an application type associated with the UE, an indication that the UE is associated with a low power mode, an amount of power in a battery associated with the UE, a charge state indication associated with the UE, age or health associated with a UE battery, as well as other factors. In some examples, the eNB 108 comprising the dual connectivity controller component 122 can determine subscriber data and/or capability data based at least in part on the state data (or other information).

At 414, the eNB 108 can receive data for the UE, which may be transmitted from a data node 416. In some examples, the data from the data node 416 can be in response to a request from the UE 102.

At point 418 the dual connectivity controller component 122 can determine that the UE 102 should not use an EN-DC connection that includes the 5G connection 120, and should instead continue using just the LTE connection 118 established at point 406. For example, the dual connectivity controller component 122 can determine that using the EN-DC connection to send or receive data would not have a perceivable benefit to a user of the UE 102 relative to using the LTE connection 118 alone, and/or would drain the battery 104 at a rate that is not considered worth the benefits of the EN-DC connection relative to the LTE connection 118 alone. Factors that the dual connectivity controller component 122 can use to determine whether to use an EN-DC connection or the LTE connection 118 alone are discussed in more detail above with respect to FIGS. 1-3, as well as throughout this disclosure.

Based on determining that the UE 102 should not use an EN-DC connection at point 418, the dual connectivity controller component 122 can refrain from establishing dual connectivity at point 420.

FIG. 4 accordingly shows operations and messages in a situation in which the UE 102 changes from an idle state to a connected state and the dual connectivity controller component 122 determines that an EN-DC connection should not be used. If the dual connectivity controller component 122 instead determines that an EN-DC connection can be used, the dual connectivity controller component 122 may send an instruction to the gNB 110 to establish an EN-DC connection associated with the UE 102.

Figure 5:
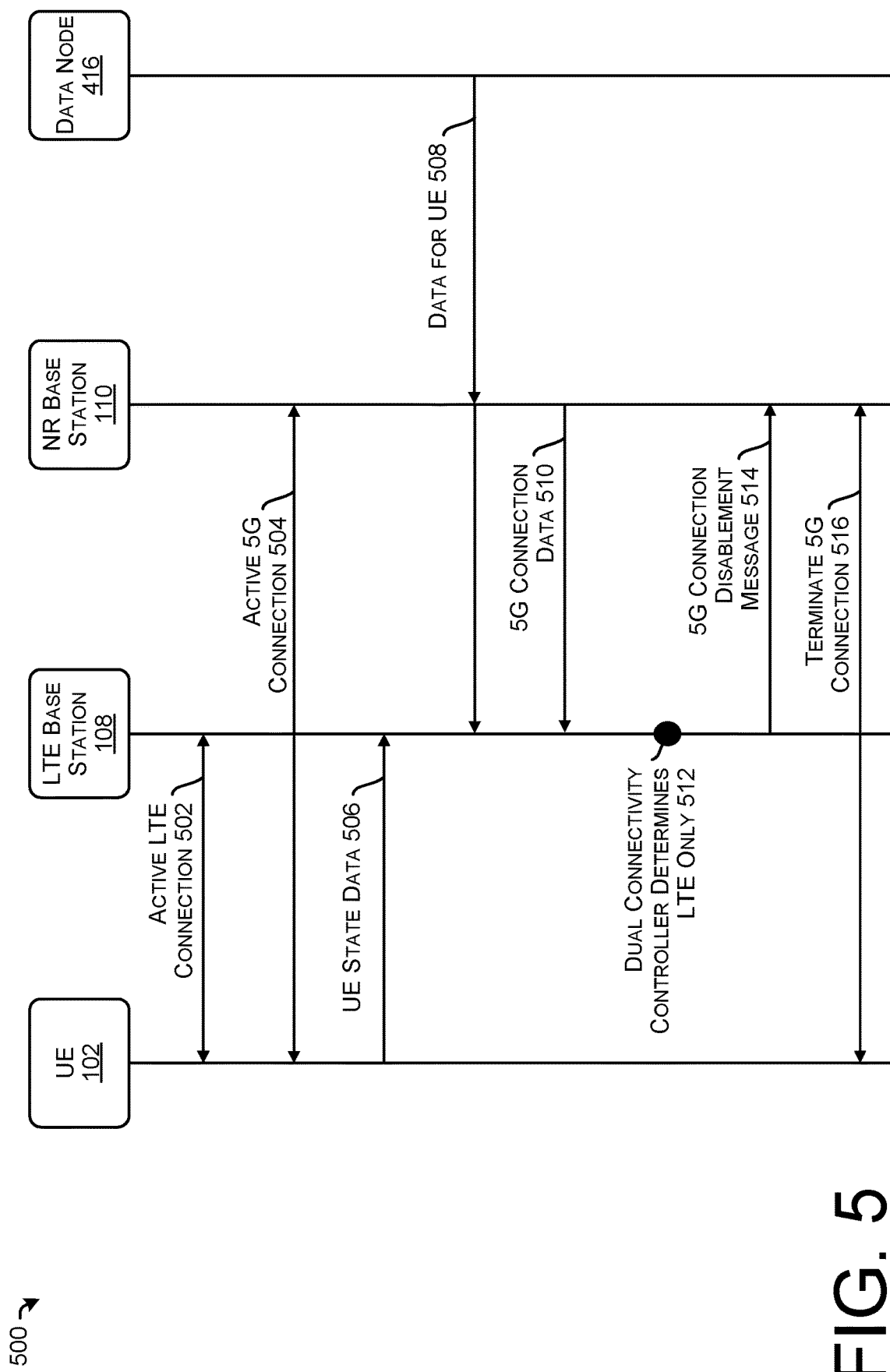
FIG. 5 shows a second sequence diagram of example operations and messages a base station can use to downgrade from an established EN-DC connection to an LTE connection alone.

FIG. 5 shows a second sequence diagram 500 of example operations and messages a base station can use to downgrade from an established EN-DC connection to an LTE connection alone.

As shown in FIG. 5, the UE 102 can have an active EN-DC connection, including an active LTE connection 118 established with the eNB 108 at point 502 and an active 5G connection 120 established with the gNB 110 at point 504. The UE 102 may be in an RRC connected state, or other connected state, while the EN-DC connection is active. In some examples, the UE 102 may be using the EN-DC connection to upload and/or download data. For instance, the UE 102 may be using the EN-DC connection to stream video, or to perform an upload or download of a data file.

At point 506, the UE 102 can send UE state data to the eNB 108 (and/or to the gNB 110, or another network device including the dual connectivity controller component 122).

Further, at point 508, the data node 416 can send data to the gNB 110 and/or the eNB 108. For example, if the EN-DC connection is established in accordance with 3GPP Option 3, the data node 416 can transmit data to the eNB 108 where the data is split between the LTE connection 118 and the NR connection 120 at the eNB 108. In the context of Option 3a, data is split between the LTE connection 118 and the NR connection 120 at the core network 106, in which case the data node 416 would send data to both the eNB 108 and the gNB 110. In the context of Option 3x, the data node 416 can transmit data to the gNB 110 where the data is split between the LTE connection 118 and the NR connection 120 at the gNB 110.

In an example where the EN-DC connection is implemented as an Option 3x connection, and where the dual connectivity controller component 122 is implemented in the eNB 108, at point 510, the gNB 110 can send 5G connection data to the eNB 108. For example, the 5G connection data can include an amount of data transmitted by the NR connection 120 to the UE 102.

At point 512, the dual connection controller component 122 can determine, based at least in part on the UE state data, the data for the UE, and/or the 5G connection data, whether to maintain or downgrade the EN-DC connection. In this example, at point 512, the dual connectivity controller component 122 can determine that the UE 102 should no longer use the EN-DC connection, and should continue using just the LTE connection 112 established at point 502. For example, the dual connectivity controller component 122 may determine that continuing to use the EN-DC connection to send or receive data would not have a perceivable benefit to a user of the UE 102 relative to using the LTE connection 118 alone, and/or would drain the battery 104 at a rate that is not considered worth the benefits of the EN-DC connection relative to the LTE connection 118 alone. Factors that the dual connectivity controller component 122 can use to determine whether to use an EN-DC connection or the LTE connection 118 alone are discussed in more detail above with respect to FIGS. 1-3, as well as throughout this disclosure.

Based on determining that the UE 102 should not use an EN-DC connection at point 512, the dual connectivity controller component 122 can send an EN-DC disablement message to the gNB 110 at point 514. In some examples, the EN-DC disablement message can be an RRC message that includes a flag or other value that signifies that the dual connectivity controller component 122 has determined to use the LTE connection 118 alone, without also using the established 5G connection 120.

At point 516, in response to the EN-DC disablement message, the gNB 110 and/or UE 102 can terminate or tear down the 5G connection 120 to disable the EN-DC connection 120. However, the LTE connection 118 can remain active and in place, such that the UE 102 can continue sending and receiving data via the LTE connection 118 with the eNB 108. In other examples, the telecommunication network can terminate both the LTE connection 118 and the 5G connection 120 in response to the EN-DC disablement message to terminate the EN-DC connection, but can establish a new replacement LTE connection 118 with the UE 102 so that the UE 102 can continue sending and receiving data via the replacement LTE connection 118.

FIG. 5 accordingly shows operations and messages in a situation in which a UE 102 is in a connected state and is actively using an EN-DC connection, but determines to downgrade to use only the LTE connection 118 while the UE 102 remains in the connected state. In other situations, a UE 102 in a connected state may have one or both of an active LTE connection 118 and an active 5G connection 120, but may disable or tear down all of the active connections when the UE 102 changes to an inactive or idle state. For example, when the UE 102 changes from an RRC connected state to an RRC idle state, any existing LTE connections 118 and 5G connections 120 can be terminated or torn down. When the UE 102 next returns from the idle state to the connected state, and the dual connectivity controller component 122 determines that only the LTE connection 118 should be used, the eNB can use the operations and messages shown in FIG. 4 to refrain from establishing an EN-DC connection with the telecommunication network. If the dual connectivity controller component 122 instead determines that an EN-DC connection can be used when the UE 102 next returns from the idle state to the connected state, the eNB 108 can instruct the gNB 110 to establish the 5G connection 120 with the UE 102.

Figure 6:
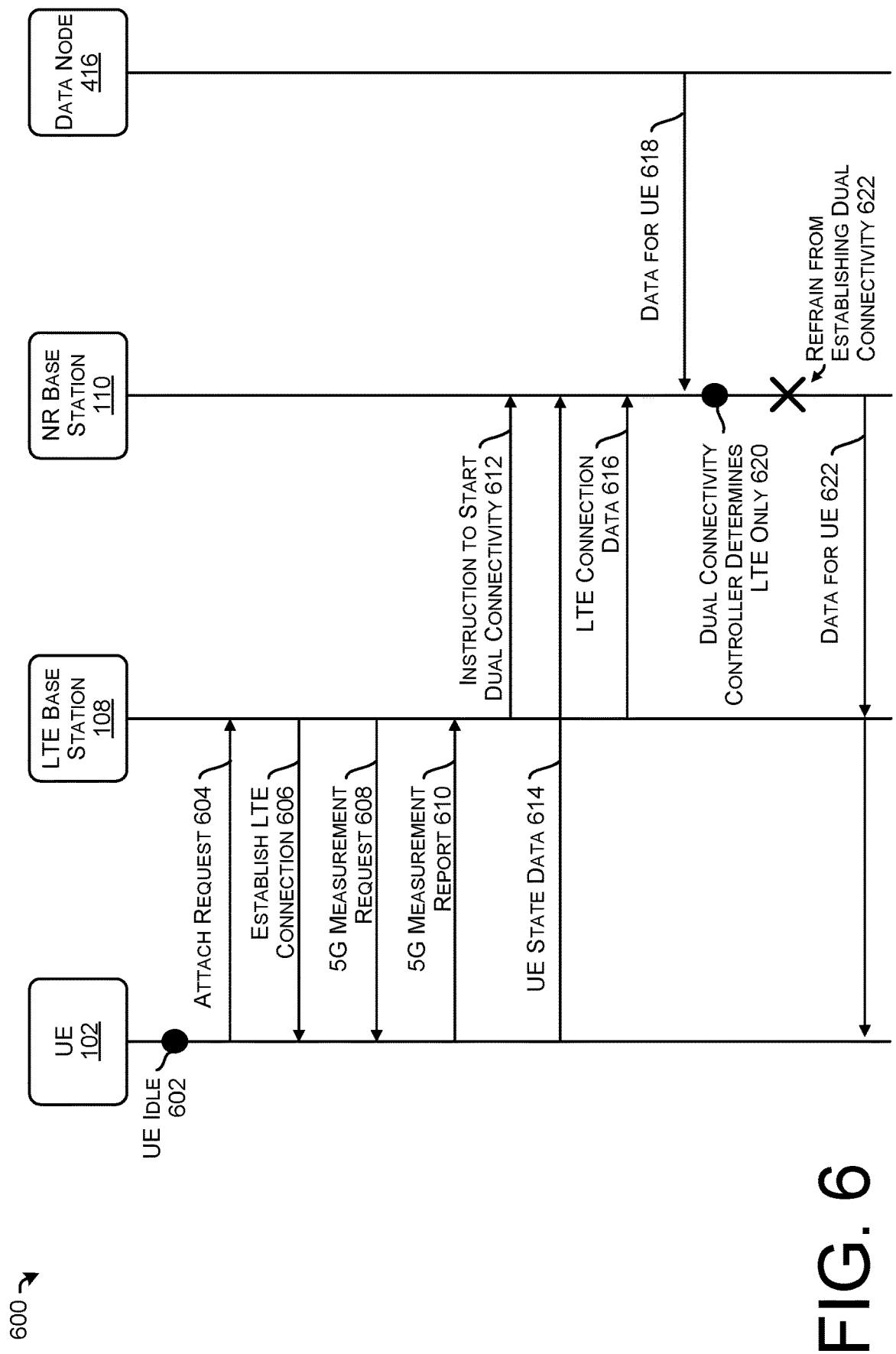
FIG. 6 shows a third sequence diagram of example operations and messages a base station can use to prevent an EN-DC connection from being established.

FIG. 6 shows a third sequence diagram 600 of example operations and messages a base station can use to prevent an EN-DC connection from being established.

At point 602, the UE 102 can be idle. For example, the UE 102 may be in a Radio Resource Control (RRC) idle state in which no active connection exists between the UE 102 and the eNB 108. However, when the UE 102 determines that data is to be exchanged with the UE 102, the UE 102 can enter an active or connected state and send an attach request (also referred to as a connection request) to the eNB 108 at point 604. For example, the UE 102 can change from an RRC idle state to an RRC connected state when the UE 102 receives a paging message from the eNB 108 indicating that the telecommunication network has data to send to the UE 102, or because the UE 102 has data to send via the telecommunication network. In some examples, the connection request can be an RRC connection request. In response to the connection request, at point 606 the UE 102 and the eNB 108 can establish the LTE connection 118. Establishment of the LTE connection 118 can include establishing one or more bearers associated with the LTE connection 118.

At point 608, the eNB 108 can send a 5G measurement request to the UE 102. In some examples, the 5G measurement request can be included in an RRC reconfiguration message sent by the eNB 108. The 5G measurement request can request that the UE 102 measure signal strengths and/or other attributes related to 5G NR frequencies that may be used to connect to the gNB 110, and send a 5G measurement report containing such measurements to the eNB 108. In some examples, the eNB 108 can be configured to determine from the 5G measurement report returned by the UE 102 whether the measurements are sufficient for a 5G connection 120, and if so, instruct the gNB 110 to establish the 5G connection 114 with the UE 102 in addition to the LTE connection 112 established at point 406. In other examples, the eNB 108 may pass the 5G measurement report to the gNB 110 or other network entity (e.g., a network entity including the dual connectivity controller component 122) to determine whether to establish the 5G connection 120.

At point 612, and based at least in part on the 5G measurement report, the eNB 108 can send an instruction to the gNB to start a dual connectivity connection. In response, the gNB 110 can establish a bearer (e.g., an SCG bearer) between the gNB 110 and a network node such as a P-Gateway. Further, the gNB 110 can establish a connection to the eNB 108 via an X2 interface.

At point 614, the UE 102 can send UE state data to the gNB 110. As discussed herein, the UE state data can include, but is not limited to, one or more of data about a display status of the UE, sensor data from the UE, an application type associated with the UE, an indication that the UE is associated with a low power mode, an amount of power in a battery associated with the UE, a charge state indication associated with the UE, age or health associated with a UE battery, as well as other factors. In some examples, the gNB 110 comprising the dual connectivity controller component 122 can determine subscriber data and/or capability data based at least in part on the state data (or other information).

In an example where the EN-DC connection is implemented as an Option 3x connection, and where the dual connectivity controller component 122 is implemented in the gNB 110, at point 616, the eNB 108 can send LTE connection data to the gNB 110. For example, the LTE connection data can include, but is not limited to, one or more of Channel Quality Information (CQI) data, signal-to-noise ratio (SNR) data, signal-to-interference plus noise ratio (SINR) data, signal-to-noise plus distortion ratio (SNDR) data, or data associated with a bandwidth or capability of the LTE connection.

At 618, the gNB 110 can receive data for the UE, which may be transmitted from the data node 416. In some examples, the data from the data node 416 can be in response to a request from the UE 102.

At point 620 the dual connectivity controller component 122 can determine that the UE 102 should not use an EN-DC connection that includes the 5G connection 120, and should instead continue using just the LTE connection 118 established at point 606. For example, the dual connectivity controller component 122 can determine that using the EN-DC connection to send or receive data would not have a perceivable benefit to a user of the UE 102 relative to using the LTE connection 118 alone, and/or would drain the battery 104 at a rate that is not considered worth the benefits of the EN-DC connection relative to the LTE connection 118 alone. Factors that the dual connectivity controller component 122 can use to determine whether to use an EN-DC connection or the LTE connection 118 alone are discussed in more detail above with respect to FIGS. 1-3, as well as throughout this disclosure.

Based on determining that the UE 102 should not use an EN-DC connection at point 418, the dual connectivity controller component 122 can refrain from establishing dual connectivity at point 622.

At point 622, the gNB 110 can send data to the eNB 108 to be transmitted to the UE 102 via the LTE connection 118.

FIG. 6 accordingly shows operations and messages in a situation in which the UE 102 changes from an idle state to a connected state, the eNB 108 sends an instruction to the gNB 110 to initiate an EN-DC connection, and the dual connectivity controller component 122 in the gNB 110 determines that an EN-DC connection should not be used. If the dual connectivity controller component 122 instead determines that an EN-DC connection can be used, the dual connectivity controller component 122 may establish a connection between the gNB 110 and the UE 102, further details of which are discussed in connection with FIG. 7.

Figure 7:
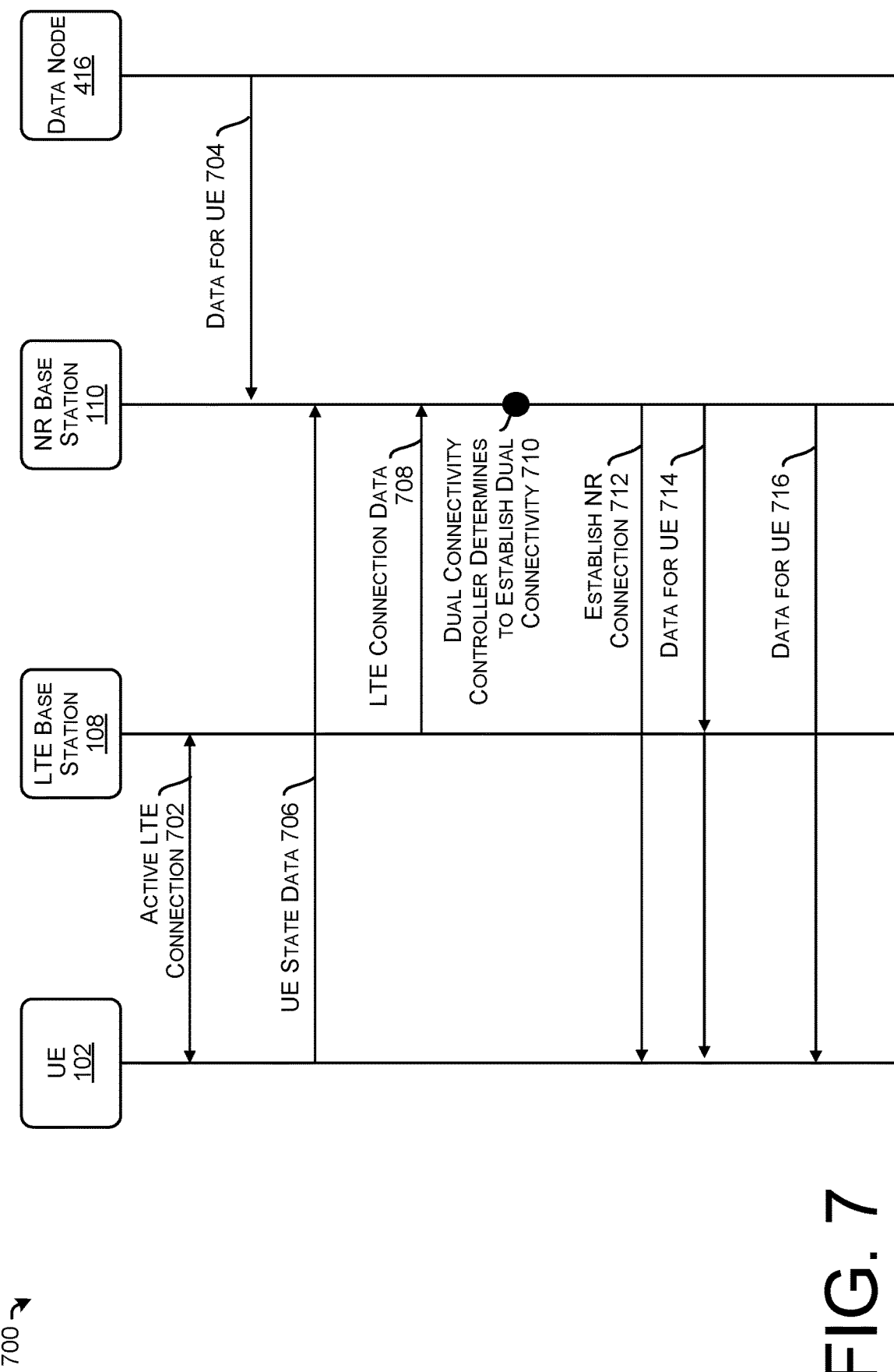
FIG. 7 shows a fourth sequence diagram of example operations and messages a base station can use to establish an EN-DC connection.

FIG. 7 shows a fourth sequence diagram 700 of example operations and messages a base station can use to establish an EN-DC connection.

As shown in FIG. 7, the UE 102 can have an active LTE connection established with the eNB 108 at point 702. In some examples, and continuing from the operations in FIG. 6, the gNB 110 can be receiving data for the UE at point 704. However, although the gNB 110 may be an anchor point for the LTE connection 118 established at point 702, there may be no NR connection at this point. Accordingly, any data for the UE received at the point 704 may be transmitted to the eNB 108 for transmission to the UE 102.

The UE 102 may be in an RRC connected state, or other connected state, while the LTE connection 118 is active. In some examples, the UE 102 may be using the LTE connection to upload and/or download data. For instance, the UE 102 may be using the LTE connection to stream video, or to perform an upload or download of a data file.

At point 506, the UE 102 can send UE state data to the gNB 110 (and/or to the eNB 108, or another network device including the dual connectivity controller component 122).

In an example where the EN-DC connection is to be implemented as an Option 3x connection, and where the dual connectivity controller component 122 is implemented in the gNB 110, at point 708, the eNB 108 can send LTE connection data to the gNB 110. For example, the LTE connection data can include, but is not limited to, one or more of Channel Quality Information (CQI) data, signal-to-noise ratio (SNR) data, signal-to-interference plus noise ratio (SINR) data, signal-to-noise plus distortion ratio (SNDR) data, or data associated with a bandwidth or capability of the LTE connection.

At point 710 the dual connectivity controller component 122 can determine that the UE 102 should use an EN-DC connection that includes the 5G connection 120 in addition to the LTE connection 118. For example, the dual connectivity controller component 122 can determine that an amount of downlink data to be transmitted to the UE 102 meets or exceeds a data threshold whereby the data threshold may be based at least in part on the UE state data, the LTE connection data, as well as other data discussed herein.

At point 712 the gNB 110 can establish an NR connection with the UE 102.

At point 714, the gNB 110 can send data to the eNB 108 (e.g., via an X2 interface) to be transmitted to the UE 102 via the LTE connection 118.

At point 716, the gNB 110 can send data to the UE 102 via the NR connection established at point 712. In some examples, the operations at point 714 and 716 may represent sending data in accordance with an EN-DC connection.

FIG. 7 accordingly shows operations and messages in a situation in which the gNB 110, acting as an anchor point for an LTE connection for the UE 102, determines that downlink data exceeds a threshold and initiates an EN-DC connection.

Figure 8:
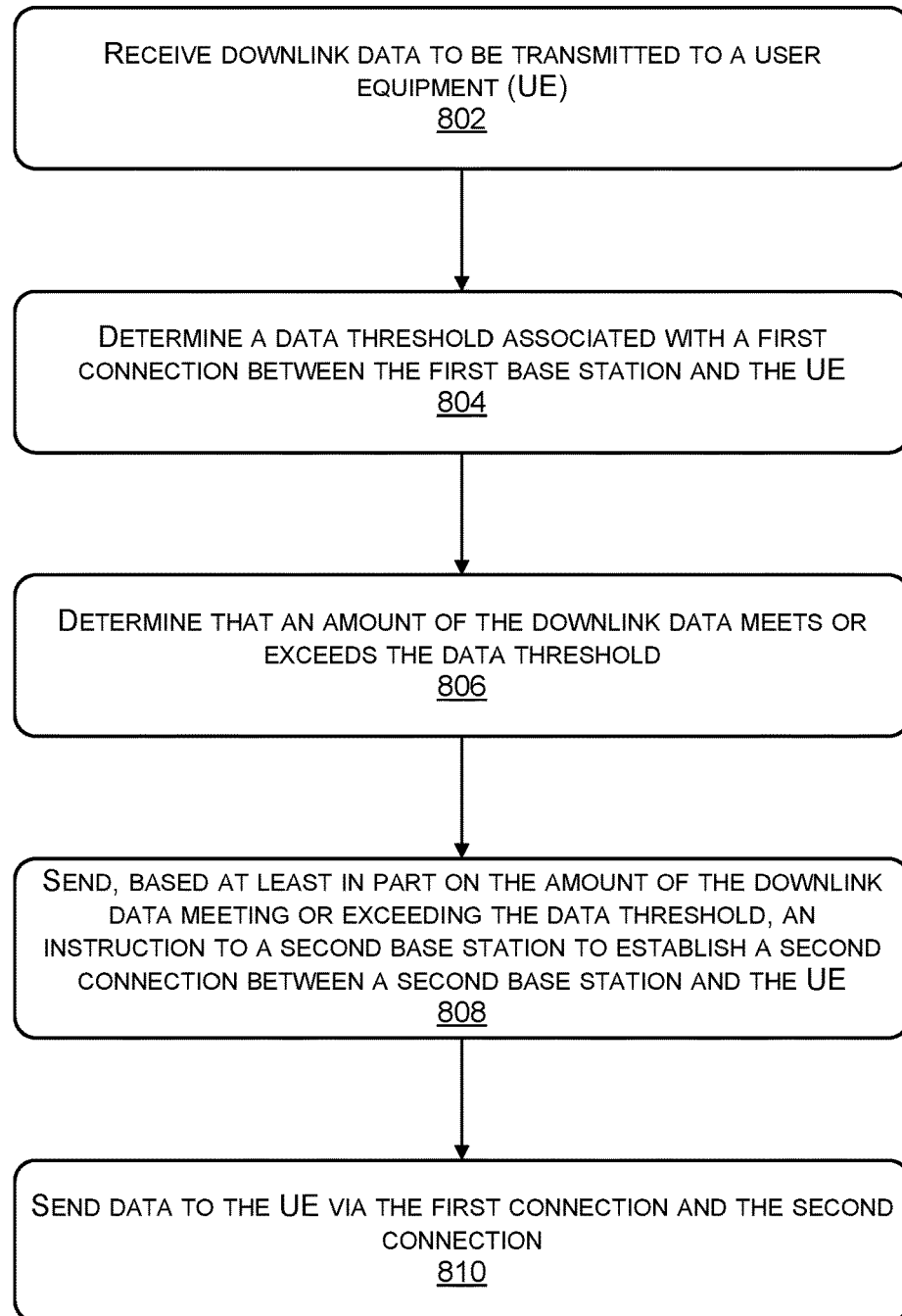
FIG. 8 illustrates another example process for dual connectivity control.

FIG. 8 illustrates another example process for dual connectivity control. The example process 800 can be performed by the eNB 108, the gNB 110, and/or by the device 200 comprising the dual connectivity controller component 122, or another component or device as discussed herein.

At operation 802, the process can include receiving downlink data to be transmitted to a user equipment (UE). In some examples, the operation 802 can include receiving the downlink data from a core network at an LTE base station. In some examples, the downlink data can correspond to an amount of data to transmit to a UE in the next transmission time interval.

At operation 804, the process can include determining a data threshold associated with a first connection between the first base station and the UE. For example, the data threshold can be associated with a capability to transmit data to the UE within a particular period of time, such as a next transmission time interval. In some examples, the data threshold can be based at least in part on CQI data associated with the first connection and/or based on other devices in communication with the first base station. For example, if the first base station is congested, it may have fewer resources to allocate to the first connection than a situation where the first base station is not congested.

In some examples, the operation 804 can include receiving signal data associated with the first connection. The signal data can include, but is not limited to, one or more of CQI data, SNR data, SINR data, SNDR data, and the like. In some examples, the data threshold can be based at least in part on the signal data.

In some examples, the operation 804 can include determining subscriber data associated with the UE. For example, a subscriber type may be a first subscriber type associated with a higher priority than a second subscriber type. In some examples, an amount of resources to be allocated to the first connection can be based at least in part on the subscriber type.

In some examples, the operation 804 can include receiving state data associated with the UE. In some examples, the state data can include one or more of an indication that the UE is associated with a low power mode, an amount of power in a battery associated with the UE, a charge state indication associated with the UE, and the like.

In some examples, the operation 804 can include determining a data type associated with the downlink data. In some examples, the data type may include, but is not limited to, a priority level (e.g., associated with whether delay is allowed), voice data, video data, streaming data, gaming data, TCP, UDP, and the like.

At operation 806, the process can include determining that an amount of the downlink data meets or exceeds the data threshold.

At operation 808, the process can include sending, based at least in part on the amount of the downlink data meeting or exceeding the data threshold, an instruction to a second base station to establish a second connection between a second base station and the UE. In some examples, the second base station is an NR base station, and the second instruction can be associated with establishing an EN-DC connection with the UE.

In some examples, sending the instruction can be based at least in part on one or more of the UE state data, data type, subscriber data, signal data, and the like. In some examples, sending the instruction can be based on an absolute or relative amount of data by which the downlink data exceeds the data threshold. In some examples, the data threshold may be exceeded by an amount for a period of time before sending the instruction. In some examples, the amount and/or period of time can be based on the factors discussed herein. For example, if the UE is associated with a low power state, the amount by which the threshold exceeded may be higher in order to trigger sending the instruction. Further, if the UE is associated with a low power state, the period of time for exceeding the data threshold may increase. In some examples, the amount and period of time can be determined by the dual connectivity controller component, as discussed herein.

At operation 810, the process can include sending data to the UE via the first connection and the second connection. That is, the operation 810 can include sending data to the UE via an EN-DC connection. In some examples, the EN-DC connection can be implemented in accordance with one or more of 3GPP Option 3, Option 3a, or Option 3x. Thus, the operation 810 can include establishing bearers or split bearers and receiving or sending data to the first base station or the second base station in accordance with the Options 3, 3a, and 3x, as discussed herein.

In some examples, the process 800 can include evaluating an amount of downlink data to the UE over time to determine whether to maintain the EN-DC connection or to downgrade the EN-DC connection to include only the LTE connection (or the NR connection).

Figure 9:
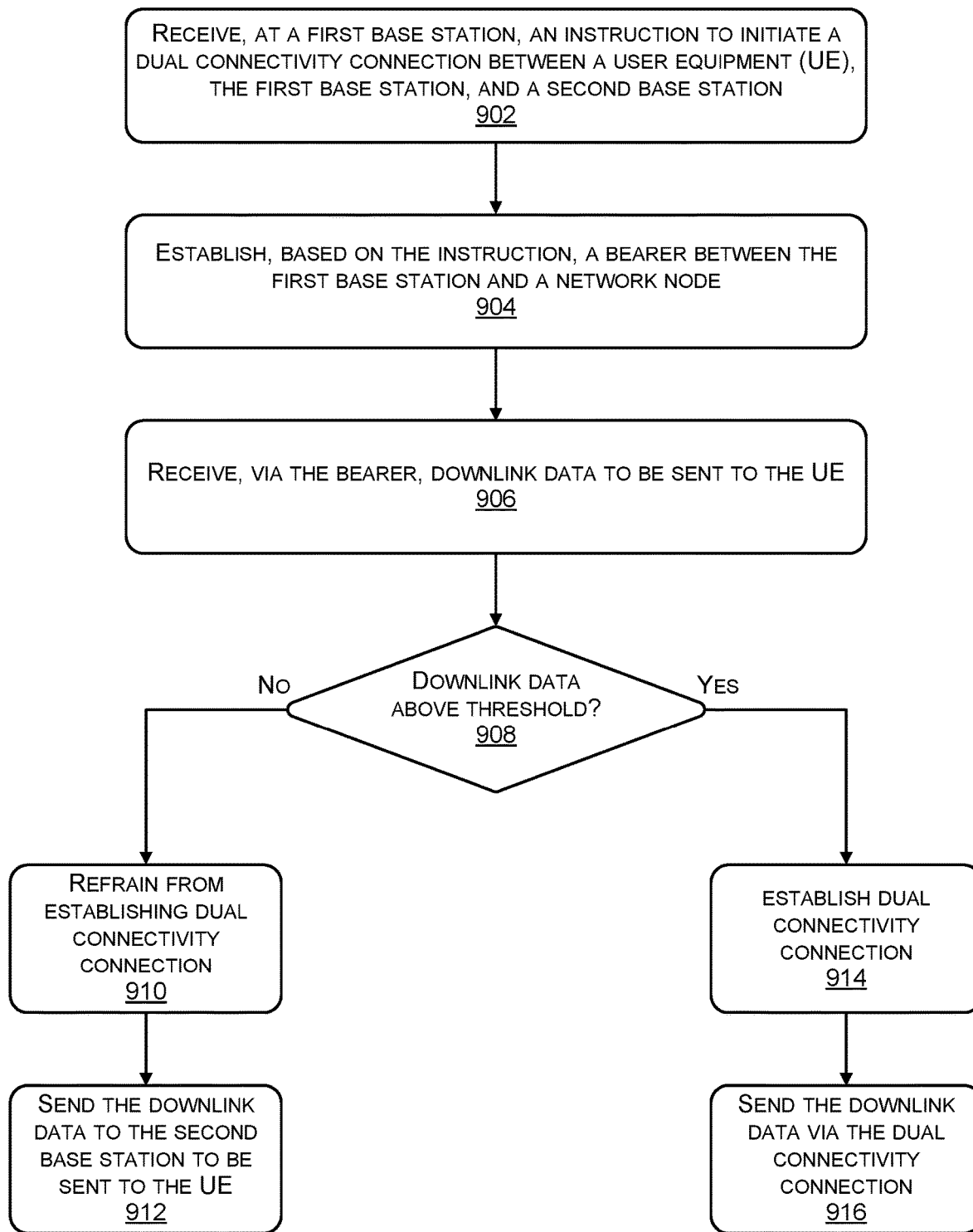
FIG. 9 illustrates another example process for dual connectivity control.

FIG. 9 illustrates another example process for dual connectivity control. The example process 900 can be performed by the eNB 108, the gNB 110, and/or by the device 200 comprising the dual connectivity controller component 122, or another component or device as discussed herein.

At operation 902, the process can include receiving, at a first base station, an instruction to initiate a dual connectivity connection between a user equipment (UE), the first base station, and a second base station. For example, the first base station can be the gNB 110, the UE can be the UE 102, and the second base station can be the eNB 108. In some examples, the instruction can be received at the first base station from the second base station.

At operation 904, the process can include establishing, based on the instruction, a bearer between the first base station and a network node. For example, if the gNB is a secondary base station, the operation 904 can include establishing an SCG (Secondary Cell Group) bearer between a network node, such as a P-Gateway, and the first base station such that the first base station anchors a communication for the UE. In some examples, the operation 904 can include transferring the anchor from the second base station to the first base station.

At operation 906, the process can include receiving, via the bearer, downlink data to be sent to the UE. For example, the downlink data can be any data to be transmitted to the UE. In some examples, the operation 906 can include receiving the downlink data in a buffer or queue, such as one associated with a PDCP layer.

At operation 908, the process can include determining whether the downlink data meets or exceeds a threshold. In some examples, the threshold can be determined based on UE state data, signal data, network data, capabilities of the second base station, and the like, as discussed herein. If the downlink data is not above the threshold (e.g., "no" in operation 908), the process continues to operation 910.

At operation 910, the process can include refraining from establishing dual connectivity connection. In some examples, a dual connectivity connection can not be implemented despite the instruction received in the operation 902 and despite the communication anchored on the first base station.

At operation 912, the process can include sending the downlink data to the second base station to be sent to the UE. For example, the operation 912 can include sending the downlink data to the second base station via an X2 interface for the data to be sent from the second base station to the UE.

If the downlink data is above the threshold (e.g., "yes" in operation 908), the process can continue to operation 194.

At operation 914, the process can include establishing dual connectivity connection. In some examples, the operation 914 can include establishing a radio bearer between the first base station and the UE.

At operation 916, the process can include sending the downlink data via the dual connectivity connection. For example, at least a first portion of downlink data can be sent from the first base station to the UE and at least a second portion of downlink data can be sent from the first base station to the second base station to be transmitted to the UE. In some examples, the operation 916 can include sending data to a UE in accordance with an Option 3x network implementation.

EXAMPLE CLAUSES

A: A method comprising: receiving, at a data buffer associated with a first base station, first downlink data to be transmitted to a user equipment (UE); receiving signal data associated with a first connection between the first base station and the UE; determining, based at least in part on the signal data, a data threshold; determining that an amount of the first downlink data meets or exceeds the data threshold; and sending, based at least in part on the amount of the first downlink data meeting or exceeding the data threshold, an instruction to a second base station to establish a second connection between a second base station and the UE; and sending second downlink data to the UE via the first connection; wherein third downlink data is transmitted by the second base station to the UE via the second connection.

B. The method of paragraph A, further comprising: receiving state data associated with the UE; and sending the instruction based at least in part on the state data.

C: The method of paragraph B, wherein the state data comprises at least one of: an indication that the UE is associated with a low power mode; an amount of power in a battery associated with the UE; or a charge state indication associated with the UE.

D: The method of any of paragraphs A-C, wherein: the first base station is a Fourth-Generation (4G) base station; and the second base station is a Fifth-Generation (5G) base station.

E: The method of any of paragraphs A-D, wherein the amount of the first downlink data is a first amount associated with a first time, and wherein the instruction is a first instruction, the method further comprising: determining that a second amount of fourth downlink data is below the data threshold at a second time after the first time; and based at least in part on the second amount being below the data threshold at the second time, sending a second instruction to the second base station to release the second connection.

F. The method of any of paragraphs A-E, further comprising: receiving subscriber data associated with the UE; and at least one of: determining the data threshold based at least in part on the subscriber data; or sending the instruction based at least in part on the subscriber data.

G. The method of any of paragraphs A-F, further comprising: determining a data type associated with the first downlink data; and sending the instruction based at least in part on the data type.

H. The method of any of paragraphs A-G, wherein the signal data comprises at least one of: Channel Quality Information (CQI) data; signal-to-noise ratio (SNR) data; signal-to-interference plus noise ratio (SINR) data; or signal-to-noise plus distortion ratio (SNDR) data.

I: The method of any of paragraphs A-H, further comprising: receiving the first downlink data from a core network; and receiving the second downlink data from the second base station.

J: A system comprising: one or more processors; and one or more non-transitory computer-readable media storing computer-executable instructions that, when executed, cause the one or more processors to perform operations comprising: receiving, at a first base station, first downlink data to be transmitted to a user equipment (UE); receiving data associated with a first connection between the first base station and the UE; determining, based at least in part on the data, a data threshold; determining that an amount of the first downlink data meets or exceeds the data threshold; and sending, based at least in part on the amount of the first downlink data meeting or exceeding the data threshold, an instruction to a second base station to establish a second connection between a second base station and the UE; and sending second downlink data to the UE via the first connection; wherein third downlink data is transmitted by the second base station to the UE via the second connection.

K: The system of paragraph J, the operations further comprising: receiving state data associated with the UE; and sending the instruction based at least in part on the state data.

L: The system of paragraph J or K, wherein the amount of the first downlink data is a first amount associated with a first time, and wherein the instruction is a first instruction, the operations further comprising: determining that a second amount of fourth downlink data is below the data threshold at a second time after the first time; and based at least in part on the second amount being below the data threshold at the second time, sending a second instruction to the second base station to release the second connection.

M: The system of any of paragraphs J-L, the operations further comprising: determining a data type associated with the first downlink data; and sending the instruction based at least in part on the data type.

N: The system of any of paragraphs J-M, wherein the data comprises at least one of: Channel Quality Information (CQI) data; signal-to-noise ratio (SNR) data; signal-tointerference plus noise ratio (SINR) data; or signal-to-noise plus distortion ratio (SNDR) data.

O: The system of any of paragraphs J-N, the operations further comprising: receiving the first downlink data from a core network; and receiving the second downlink data from the second base station.

P: The system of any of paragraphs J-O, wherein the amount of the first downlink data is to be transmitted in a transmission time interval associated with an LTE connection.

Q: One or more non-transitory computer-readable media storing computer-executable instructions that, when executed, cause one or more processors to perform operations comprising: receiving, at a first base station, first downlink data to be transmitted to a user equipment (UE); receiving first data associated with a first connection between the first base station and the UE; receiving second data associated with a state of the UE; determining, based at least in part on the first data and the second data, a data threshold; determining that an amount of the first downlink data meets or exceeds the data threshold; and sending, based at least in part on the amount of the first downlink data meeting or exceeding the data threshold, an instruction to a second base station to establish a second connection between a second base station and the UE; and sending second downlink data to the UE via the first connection; wherein third downlink data is transmitted by the second base station to the UE via the second connection.

R: The one or more non-transitory computer-readable media of paragraph Q, the operations further comprising: sending the instruction based at least in part on the second data.

S: The one or more non-transitory computer-readable media of paragraph Q or R, wherein the first data comprises at least one of: Channel Quality Information (CQI) data; signal-to-noise ratio (SNR) data; signal-to-interference plus noise ratio (SINR) data; or signal-to-noise plus distortion ratio (SNDR) data.

T: The one or more non-transitory computer-readable media of any of paragraphs Q-S, wherein the second data comprises at least one of: an indication that the UE is associated with a low power mode; an amount of power in a battery associated with the UE; or a charge state indication associated with the UE.

U: A method comprising: receiving, at a New Radio (NR) base station, an instruction to initiate a dual connectivity connection between a user equipment (UE), the NR base station, and a Long-Term Evolution (LTE) base station; based at least in part on the instruction, establishing a bearer between the NR base station and a gateway node; receiving, via the bearer, downlink data to be sent to the UE; determining that an amount of the downlink data is less than a data threshold; based at least in part on the amount of the downlink data being less than the data threshold, refraining from establishing a NR connection between the NR base station and the UE; and sending the downlink data to the LTE base station to be sent to the UE.

V. The method of paragraph U, further comprising: receiving state data associated with the UE; and determining the data threshold based at least in part on the state data.

W: The method of paragraph V, wherein the state data comprises at least one of: an indication that the UE is associated with a low power mode; an amount of power in a battery associated with the UE; or a charge state indication associated with the UE.

X: The method of any of paragraphs U-W, further comprising: determining the data threshold based at least in part on signal data associated with a connection between the LTE base station and the UE.

Y. The method of paragraph X, wherein the signal data comprises at least one of: Channel Quality Information (CQI) data; signal-to-noise ratio (SNR) data; signal-to-interference plus noise ratio (SINR) data; signal-to-noise plus distortion ratio (SNDR) data; or bandwidth data associated with the connection.

Z: The method of any of paragraphs U-Y, wherein the amount of the downlink data is a first amount of first downlink data associated with a first time, the method further comprising: determining that a second amount of second downlink data meets or exceeds the data threshold at a second time after the first time; based at least in part on the second amount meeting or exceeding the data threshold at the second time, establishing a first connection between the NR base station and the UE; sending a first portion of the second downlink data to the UE via the first connection; and sending a second portion of the downlink data to the LTE base station to be transmitted to the UE via a second connection.

AA: The method of any of paragraphs U-Z, further comprising: sending the downlink data to the LTE base station via an X2 interface.

AB: The method of any of paragraphs U-AA, further comprising: receiving the instruction from the LTE base station.

AC: A system comprising: one or more processors; and one or more non-transitory computer-readable media storing computer-executable instructions that, when executed, cause the one or more processors to perform operations comprising: receiving, at a first base station, an instruction to initiate a dual connectivity connection between a user equipment (UE), the first base station, and a second base station; based at least in part on the instruction, establishing a bearer between the first base station and a network node; receiving, via the bearer, downlink data to be sent to the UE; determining that an amount of the downlink data is less than a data threshold; based at least in part on the amount of the downlink data being less than the data threshold, refraining from establishing a connection between the first base station and the UE; and sending the downlink data to the second base station to be sent to the UE.

AD: The system of paragraph AC, wherein: the first base station is a New Radio base station; and the second base station is a Long-Term Evolution base station.

AE: The system of paragraph AC or AD, the operations further comprising: receiving state data associated with the UE; and determining the data threshold based at least in part on the state data.

AF: The system of paragraph AE, wherein the state data comprises at least one of: an indication that the UE is associated with a low power mode; an amount of power in a battery associated with the UE; or a charge state indication associated with the UE.

AG: The system of any of paragraphs AC-AF, wherein the connection is a first connection, the operations further comprising: determining the data threshold based at least in part on signal data associated with a second connection between the second base station and the UE.

AH: The system of paragraph AG, wherein the signal data comprises at least one of: a Channel Quality Information (CQI) data; signal-to-noise ratio (SNR) data; signal-tointerference plus noise ratio (SINR) data; signal-to-noise plus distortion ratio (SNDR) data; or capability data associated with the connection.

AI: The system of any of paragraphs AC-AH, wherein the connection is a first connection, and wherein the amount of the downlink data is a first amount of first downlink data associated with a first time, the operations further comprising: determining that a second amount of second downlink data meets or exceeds the data threshold at a second time after the first time; based at least in part on the second amount meeting or exceeding the data threshold at the second time, establishing the first connection between the first base station and the UE; sending a first portion of the second downlink data to the UE via the first connection; and sending a second portion of the downlink data to the second base station to be transmitted to the UE via a second connection.

AJ: One or more non-transitory computer-readable media storing computer-executable instructions that, when executed, cause one or more processors to perform operations comprising: receiving, at a New Radio (NR) base station, an instruction to initiate a dual connectivity connection between a user equipment (UE), the NR base station, and a Long-Term Evolution (LTE) base station; based at least in part on the instruction, establishing a bearer between the NR base station and a network node; receiving, via the bearer, downlink data to be sent to the UE; determining that an amount of the downlink data is less than a data threshold; based at least in part on the amount of the downlink data being less than the data threshold, refraining from establishing a NR connection between the NR base station and the UE; and sending the downlink data to the LTE base station to be sent to the UE.

AK: The one or more non-transitory computer-readable media of paragraph AJ, the operations further comprising: receiving state data associated with the UE; and determining the data threshold based at least in part on the state data.

AL: The one or more non-transitory computer-readable media of paragraph AJ or AK, the operations further comprising: receiving signal data with a connection between the LTE base station and the UE; and determining the data threshold based at least in part on the signal data.

AM: The one or more non-transitory computer-readable media of any of paragraphs AJ-AL, wherein the amount of the downlink data is a first amount of first downlink data associated with a first time, the operations further comprising: determining that a second amount of second downlink data meets or exceeds the data threshold at a second time after the first time; based at least in part on the second amount meeting or exceeding the data threshold at the second time, establishing a first connection between the NR base station and the UE; sending a first portion of the second downlink data to the UE via the first connection; and sending a second portion of the downlink data to the LTE base station to be transmitted to the UE via a second connection.

AN: The one or more non-transitory computer-readable media of any of paragraphs AJ-AM, wherein the amount of the downlink data is a first amount of first downlink data associated with a first time, the operations further comprising: refraining from establishing the NR connection between the NR base station and the UE despite the instruction to initiate the dual connectivity connection.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   receiving, at a New Radio (NR) base station, an instruction to initiate a dual connectivity connection between a user equipment (UE), the NR base station, and a Long-Term Evolution (LTE) base station;
   based at least in part on the instruction, establishing a bearer between the NR base station and a gateway node;
   receiving, via the bearer, downlink data to be sent to the UE;
   determining that an amount of the downlink data is less than a data threshold;
   based at least in part on the amount of the downlink data being less than the data threshold, refraining from establishing a NR connection between the NR base station and the UE; and
   sending the downlink data to the LTE base station to be sent to the UE.

2. The method of claim 1, further comprising:
   receiving state data associated with the UE; and
   determining the data threshold based at least in part on the state data.

3. The method of claim 2, wherein the state data comprises at least one of:
   an indication that the UE is associated with a low power mode;
   an amount of power in a battery associated with the UE; or
   a charge state indication associated with the UE.

4. The method of claim 1, further comprising:
   determining the data threshold based at least in part on signal data associated with a connection between the LTE base station and the UE.

5. The method of claim 4, wherein the signal data comprises at least one of:
   Channel Quality Information (CQI) data;
   signal-to-noise ratio (SNR) data;
   signal-to-interference plus noise ratio (SINR) data;
   signal-to-noise plus distortion ratio (SNDR) data; or
   bandwidth data associated with the connection.

6. The method of claim 1, wherein the amount of the downlink data is a first amount of first downlink data associated with a first time, the method further comprising:
   determining that a second amount of second downlink data meets or exceeds the data threshold at a second time after the first time;
   based at least in part on the second amount meeting or exceeding the data threshold at the second time, establishing a first connection between the NR base station and the UE;
   sending a first portion of the second downlink data to the UE via the first connection; and
   sending a second portion of the downlink data to the LTE base station to be transmitted to the UE via a second connection.

7. The method of claim 1, further comprising:
sending the downlink data to the LTE base station via an X2 interface.

8. The method of claim 1, further comprising:
receiving the instruction from the LTE base station.

9. A system comprising:
one or more processors; and
one or more non-transitory computer-readable media storing computer-executable instructions that, when executed, cause the one or more processors to perform operations comprising:
receiving, at a first base station, an instruction to initiate a dual connectivity connection between a user equipment (UE), the first base station, and a second base station;
based at least in part on the instruction, establishing a bearer between the first base station and a network node;
receiving, via the bearer, downlink data to be sent to the UE;
determining that an amount of the downlink data is less than a data threshold;
based at least in part on the amount of the downlink data being less than the data threshold, refraining from establishing a connection between the first base station and the UE; and
sending the downlink data to the second base station to be sent to the UE.

10. The system of claim 9, wherein:
the first base station is a New Radio base station; and
the second base station is a Long-Term Evolution base station.

11. The system of claim 9, the operations further comprising:
receiving state data associated with the UE; and
determining the data threshold based at least in part on the state data.

12. The system of claim 11, wherein the state data comprises at least one of:
an indication that the UE is associated with a low power mode;
an amount of power in a battery associated with the UE; or
a charge state indication associated with the UE.

13. The system of claim 9, wherein the connection is a first connection, the operations further comprising:
determining the data threshold based at least in part on signal data associated with a second connection between the second base station and the UE.

14. The system of claim 13, wherein the signal data comprises at least one of:
a Channel Quality Information (CQI) data;
signal-to-noise ratio (SNR) data;
signal-to-interference plus noise ratio (SINR) data;
signal-to-noise plus distortion ratio (SNDR) data; or
capability data associated with the connection.

15. The system of claim 9, wherein the connection is a first connection, and wherein the amount of the downlink data is a first amount of first downlink data associated with a first time, the operations further comprising:
determining that a second amount of second downlink data meets or exceeds the data threshold at a second time after the first time;
based at least in part on the second amount meeting or exceeding the data threshold at the second time, establishing the first connection between the first base station and the UE;
sending a first portion of the second downlink data to the UE via the first connection; and
sending a second portion of the downlink data to the second base station to be transmitted to the UE via a second connection.

16. One or more non-transitory computer-readable media storing computer-executable instructions that, when executed, cause one or more processors to perform operations comprising:
receiving, at a New Radio (NR) base station, an instruction to initiate a dual connectivity connection between a user equipment (UE), the NR base station, and a Long-Term Evolution (LTE) base station;
based at least in part on the instruction, establishing a bearer between the NR base station and a network node;
receiving, via the bearer, downlink data to be sent to the UE;
determining that an amount of the downlink data is less than a data threshold;
based at least in part on the amount of the downlink data being less than the data threshold, refraining from establishing a NR connection between the NR base station and the UE; and
sending the downlink data to the LTE base station to be sent to the UE.

17. The one or more non-transitory computer-readable media of claim 16, the operations further comprising:
receiving state data associated with the UE; and
determining the data threshold based at least in part on the state data.

18. The one or more non-transitory computer-readable media of claim 16, the operations further comprising:
receiving signal data with a connection between the LTE base station and the UE; and
determining the data threshold based at least in part on the signal data.

19. The one or more non-transitory computer-readable media of claim 16, wherein the amount of the downlink data is a first amount of first downlink data associated with a first time, the operations further comprising:
determining that a second amount of second downlink data meets or exceeds the data threshold at a second time after the first time;
based at least in part on the second amount meeting or exceeding the data threshold at the second time, establishing a first connection between the NR base station and the UE;
sending a first portion of the second downlink data to the UE via the first connection; and
sending a second portion of the downlink data to the LTE base station to be transmitted to the UE via a second connection.

20. The one or more non-transitory computer-readable media of claim 16, wherein the amount of the downlink data is a first amount of first downlink data associated with a first time, the operations further comprising:
refraining from establishing the NR connection between the NR base station and the UE despite the instruction to initiate the dual connectivity connection.

* * * * *